United States Patent [19]

Hurd

[11] 3,858,326
[45] Jan. 7, 1975

[54] METHOD AND APPARATUS OF OUTDOOR POSITION LOCATING

[76] Inventor: Leslie A. Hurd, 1216 Columbus, Muskogee, Okla. 74401

[22] Filed: Mar. 1, 1974

[21] Appl. No.: 447,428

Related U.S. Application Data

[63] Continuation of Ser. No. 341,802, March 16, 1973, abandoned.

[52] U.S. Cl. .................. 33/273, 33/274, 33/277, 33/285, 33/297, 33/390
[51] Int. Cl. ........................ G01c 1/00, G01c 3/04
[58] Field of Search ............ 33/272, 273, 274, 277, 33/285, 290, 292, 297, 384, 390, 275, 333, 342, 352, 274

[56] References Cited
UNITED STATES PATENTS

| 34,608 | 3/1862 | Atteneder | 33/277 |
|---|---|---|---|
| 129,311 | 7/1872 | Biggs | 33/273 |
| 1,323,148 | 11/1919 | Belleville | 33/388 |
| 1,336,010 | 4/1920 | Wingate | 33/285 |
| 1,864,832 | 6/1932 | Kegelman | 33/292 |
| 1,936,846 | 11/1933 | Leupold | 33/273 |
| 3,392,450 | 7/1968 | Herter et al. | 33/297 |

FOREIGN PATENTS OR APPLICATIONS

| 13,949 | 6/1912 | Great Britain | 33/285 |

Primary Examiner—Richard E. Aegerter
Assistant Examiner—Richard R. Stearns

[57] ABSTRACT

Method and apparatus for locating an outdoor position and determining course and distance therefrom to another position, including determining and making a fix on a chart or blank grid including a base position and the exact direction and location of landmarks therefrom, and apparatus usable for field readings on the established landmarks from a position remote from a base camp whereby a user can pinpoint such remote position and determine courses and distances from the remote position to a second position or to the base camp.

1 Claim, 14 Drawing Figures

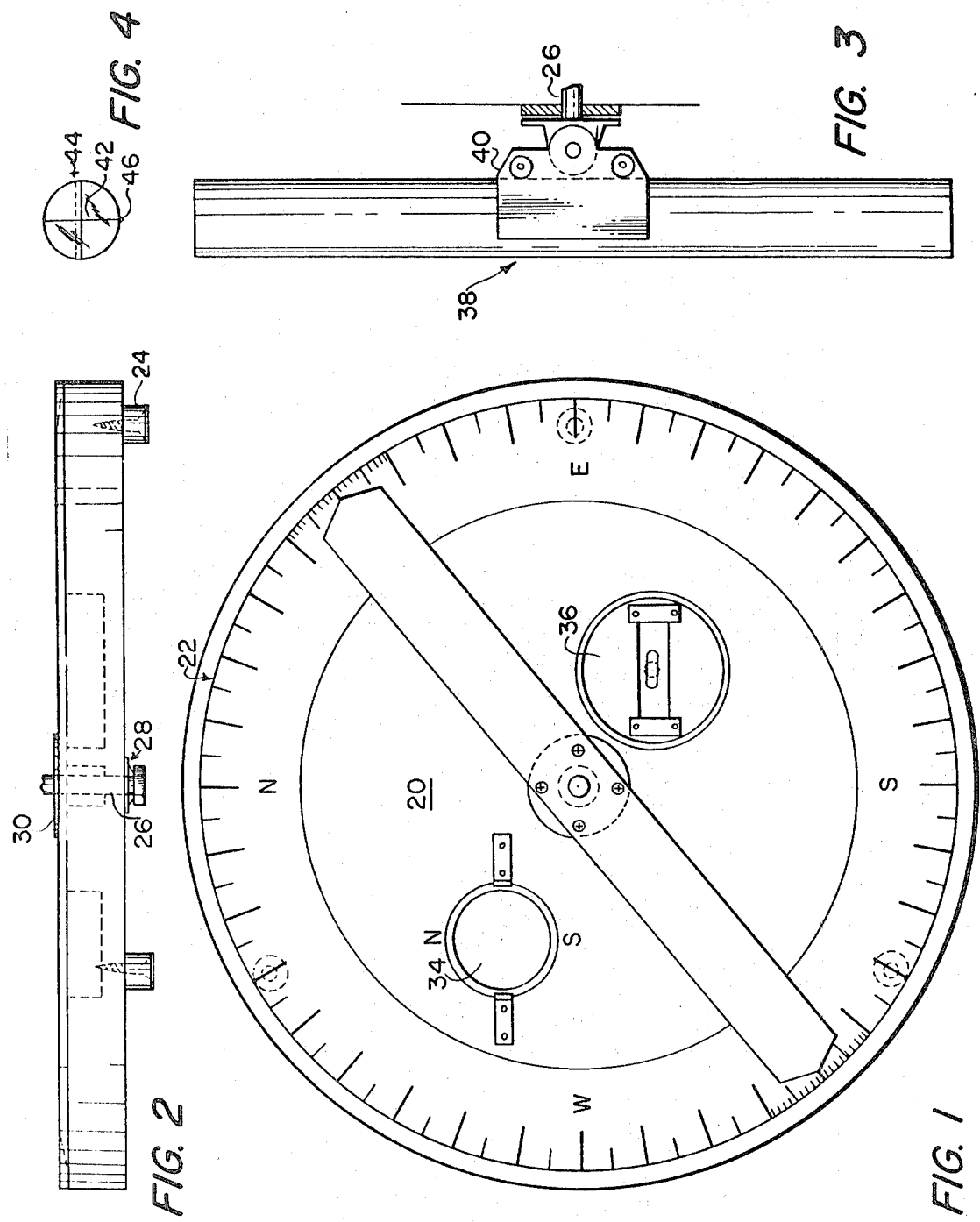

Patented Jan. 7, 1975
3,858,326
2 Sheets—Sheet 2
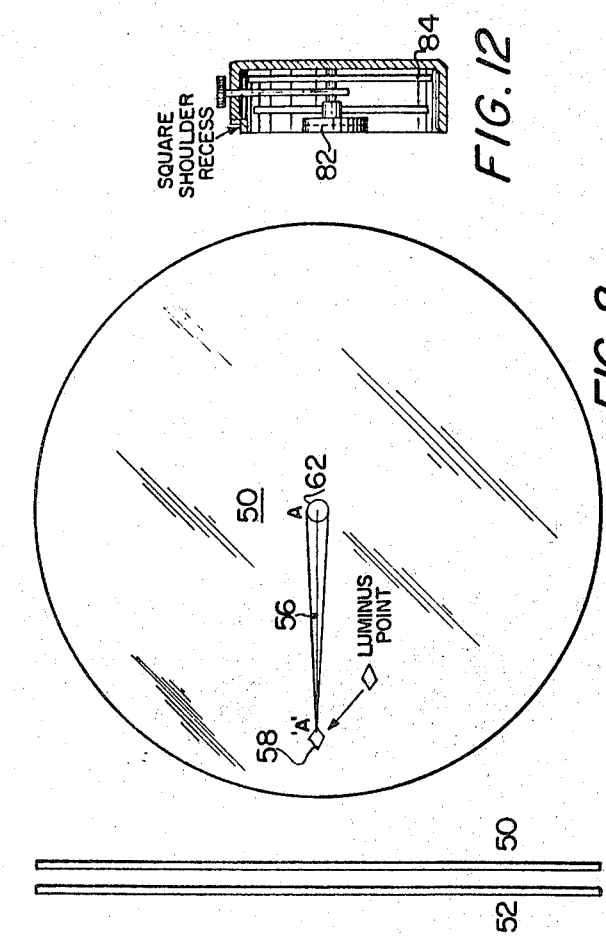
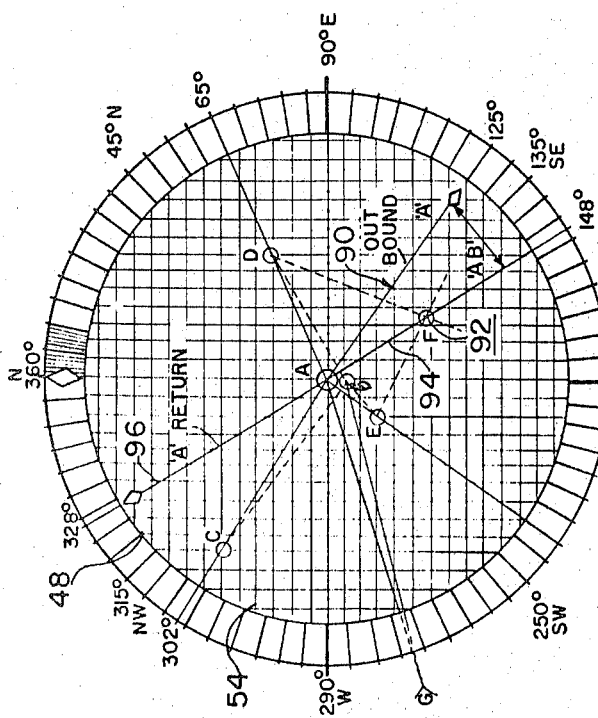
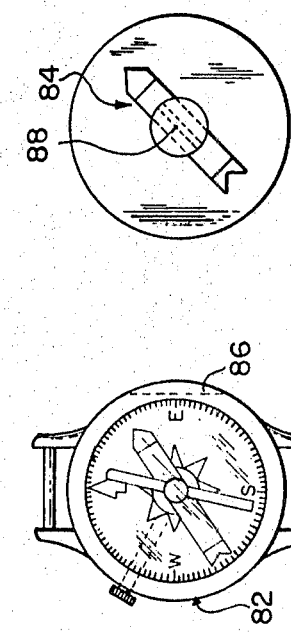
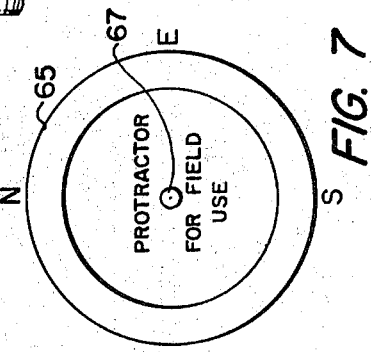
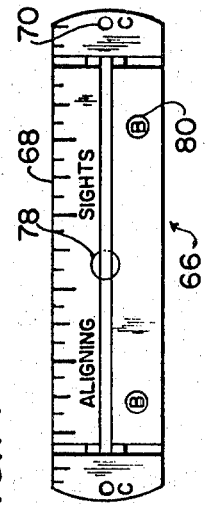

3,858,326

METHOD AND APPARATUS OF OUTDOOR POSITION LOCATING

This is a continuation of application Ser. No. 341,802 now abandoned, filed Mar. 16, 1973.

BACKGROUND OF THE INVENTION

A need exists for a method and equipment by which an average sportsman or the like can enter a strange and isolated area make camp therein and take a first fix at that position and a second at a point a predetermined distance and direction therefrom to record respective bearings of surrounding landmarks from the two points. By utilizing the bearings, he can then plot the locations of the landmarks on a chart or blank grid which can thereupon serve as a map, as hereinafter referred to so that with additional equipment the sportsman can from a remote position accurately determine his position by additional bearings on the plotted landmarks, thereby, determine a subsequent direction of travel and distance to a subsequent point. The present invention satisfied these needs.

The foregoing and other objects and advantages of the invention will be more readily apparent from the following detailed description of embodiments thereof, when taken together with the accompanying drawings in which:

FIG. 1 is a plan view of apparatus used for establishing by plotting through measuring angles relative bearings of landmarks;

FIG. 2 is a partial elevational view of the equipment of FIG. 1;

FIG. 3 is a side elevational view of a measuring scope as depicted in FIG. 1 for measuring angles or taking bearings;

FIG. 4 is a sectional view of one form of scope usable for measuring distances with said scope;

FIG. 5 is a plan view of a circular map for plotting of degree lines and containing distance measuring increments thereon;

FIG. 6 is a side elevational view of apparatus for mounting of the chart and including a front face, FIG. 7 is a plan view of a full round protractor for use in plotting on the map;

FIG. 8 is a schematic view of a plastic removable face for use with the map and protractor;

FIG. 9 is a plan view of a scale ruler and straight edge marker with elevator sights and center rib for aligning landmarks in the field and positioning on the map;

FIG. 10 is a end elevational view of a modified ruler which can be used;

FIG. 11 is a plan view of a compass for field use;

FIG. 12 is a sectional view through the compass of FIG. 11;

FIG. 13 is a rear side view of the compass; and

FIG. 14 is a schematic view in side elevation of adjusting and tightening means for the increments of FIG. 5.

Referring now in greater detail to the drawings, in FIG. 1 is shown a disc shaped base 20 which includes, for example, a plywood base coated white and applied thereover a protractor 22 having 360° markings of ½° increments. The base 20 has a plurality of leg affixing means 24 to permit erection of the base at a camp site and, additionally, serves for adjustment of the plane of the disc such as in a level. The protractor, as shown, is mounted by means of a post 26 with the inclusion of a tension washer 28, top washer 30 and a nut arrangement to permit swivel adjustment of the protractor on the base. The protractor size has tapered edges at 32. The upper surface of base 20 is recessed to accomodate a brass compass 34 and a brass swivel plate 36 with a spirit level (FIG. 1).

A sighting scope 38 mounted on a scope clamp and double swivel 40 is adapted for mounting on centerpost 26 for taking readings or bearings of distant landmarks. While the scope, as shown in FIGS. 3 and 4, includes apparatus in the nature of a telescope having a vertical cross-hair 42 and spaced horizontal cross-hairs 44, with the vertical reticule being adapted for zeroing in degree readings, and the twin horizontal reticule being adapted for measuring a desired or selected span at a predetermined distance such as a six foot span at a distance of one mile for purposes later to be described, as also an aligning pointer 46, this structure could be varied. Variants could include a horizontal measuring reticule in the scope having a spacing of the horizontal reticules which would read 8 8/10 feet at a distance of 1 mile, which is an accepted standard of manufacture and which constitutes a 6 inch span at a distance of 300 feet. Such a measuring scope could also include a pivot rest to receive a rifle with the measuring scope installed thereon, or even a bar with standard sights, when other means are used to measure distance to a second fixed point, as will appear hereinafter.

The foregoing described equipment is required in order to fix a base position and to fix the position therefrom on the map shown in FIG. 5 of remote landmarks. Upon entering a strange and isolated area and when camp is made, the foregoing equipment can be set up and by sighting and plotting a plurality of landmarks a fix can be established locating the base camp on the map. Then at a second fixed point 1 mile or other distance from the base camp as determined from the scope or other distance measuring equipment, readings or sightings can be taken in degree bearings of surrounding landmarks such as peaks, towers, butts, bluffs, passes or other high features in the area. Bearings of landmarks are taken from both the camp sight and the fixed second point, both sets of bearings are plotted on the grid, and the locations of the landmarks with respect to the camp sight are then established on the map by taking the intersection of associated pairs of landmark bearing lines.

Various possible landmarks shown plotted on the map include at A) a camp or base position; B) a fixed point, a known distance and direction from the base; C) a signal tower or the like; D) a peak; E) a lone tree on a mountain top. By taking respective bearings from points A and B using the above technique and projecting and plotting these bearings on the map 48, the exact location of the landmarks is recorded on the map for subsequent field use.

The field equipment is adapted to be carried in a pocket size holder and includes map 48, which is circular with a rotating cover of clear plastic or the like as a front disc 50. The back disc 52 carries a band having a 360° reading thereon and, preferrably, is of satin white. The one mile spacing or measuring squares are shown at 54 and, an arrow 56 is printed on the back side of the front disc by means of, for example, a red line and a diamond shape head to use as a route director. Preferrably, the diamond shaped head 58 is a luminous point. This plastic disc is removable and is mounted by means of a central hole as at 62. As shown in FIG. 14, mounting means for the discs include a coin screw axis inside a screw bolt with friction washers all generally indicated at 60, with the inclusion of a coin slot at 64 for adjustive securement.

A full round protractor 65 which in one embodiment is approximately two inches in diameter and having a center pivot hole 67, is marked with bearing degrees and adaptive for superimposing on the map. A scale ruler and straight edge marker, generally designated 66, includes the systems marker scale 68 and aligning sights 70 and this scale is mountable on the post atop the map. In one embodiment, the member 66 is so shaped as to provide straight edges at 72 and a central top depression at 74 which can be used to mount a pencil 76 or the like for sighting purposes. A pivot hole is provided at 78, as also are position markers 80 with degree position marker holes at 70 for the alignment purposes.

Also included as a part of the field equipment, is an all brass compass generally designated 82 which includes a luminous dial and a luminous tipped general direction set pointer 84. The compass has a square shoulder recess 86 and means are provided including a coin slot 88 and fixing means for setting the arrow or pointer as shown.

In use, the one mile scale ruler and straight edge marker with the elevated sights or pencil or center rib are used for aligning landmarks with the center hole fitted over the axis of the map and rotated to point out and mark the degree reading of the landmarks previously set out on the map from a position in the field. In projecting these readings upon the field map, the round protractor is centered over the landmarks in true north position and then the lines are projected on the traverse degree readings. The juncture of the so-plotted lines within the map area will pinpoint the hunter's position and enable him to set a direct course back to camp. An outbound route is generally indicated at 90 on the chart and indicates the general route taken. A fixed position is indicated at 92 from bearings taken in the field on peak D and tree E with the intersecting lines being shown to establish as at 92 a fixed position and utilizing a fixed position a line 94 is plotted with the extension thereof 96 used to determine a return course to base camp A. If desired, additional landmarks can be plotted such as shown at G of a mountain outside of the area for general orientation.

The wrist compass preferrably has a luminous direction pointer and which can be set on a course and be conveniently displayed at all times needed, day or night. The recessed square edge on the compass side is provided so that when set on the field map snugly against the side edge of the ruler, and when set on the map in true north position, the protractor rim will be in proper position for taking the degree readings on the landmarks.

The equipment and system, while not accurate to a degree in minutes as can be readily understood, is sufficiently accurate enough to direct a hunter back within sight of the base camp and, thereby, will avoid a lot of worry, walking and loss of time.

Manifestly, minor details can be effected within the scope of the disclosure without departing from the spirit and the scope of the invention as defined in and limited solely by the appended claims.

I claim:

1. Apparatus for establishing outdoor locations by plotting relatively known positions on a chart, together with the relative positions of surrounding landmarks to create a map with fixed locations thereon for use in determining another position or course and distance therefrom to another position on the map comprising:
   A. a disc shaped base having a protractor scale thereon with angular bearing markings;
   B. a measuring scope for taking angular bearings of distant landmarks from first and second known fixed positions for subsequent plotting as angular degree lines projected on a chart, so as to fix and plot at the intersections of the plotted lines the exact locations of the landmarks on the chart with respect to said known positions which thereupon constitutes a map, said measuring scope having a vertical reticule for zeroing in degree readings and twin horizontal reticules to indicate a pre-determined span at a pre-determined distance to establish by an angle and distance the location of a second known position with respect to a first known position;
   C. an elongated spirit level rotatably mounted on said base for leveling said base; and,
   D. a compass mounted in said base for orienting said protractor.

* * * * *